United States Patent
Hans

(10) Patent No.: US 7,267,215 B2
(45) Date of Patent: Sep. 11, 2007

(54) ACTUATING DEVICE FOR TRANSFERRING A CONTROL PISTON FORCE OF AN ENGAGING/DISENGAGING DEVICE TO A DOUBLE CLUTCH

(75) Inventor: Dominik Hans, Muggensturm (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 164 days.

(21) Appl. No.: 11/034,704

(22) Filed: Jan. 13, 2005

(65) Prior Publication Data
US 2005/0155835 A1 Jul. 21, 2005

(30) Foreign Application Priority Data
Jan. 16, 2004 (DE) .................. 10 2004 002 344

(51) Int. Cl.
*F16D 25/10* (2006.01)
(52) U.S. Cl. ............... 192/87.11; 192/48.8; 192/85 CA
(58) Field of Classification Search .............. 192/87.11
See application file for complete search history.

(56) References Cited
U.S. PATENT DOCUMENTS 2,376,545 A * 5/1945 Livermore ............... 74/330
2,636,585 A * 4/1953 Livermore ............... 192/87.11
3,907,085 A * 9/1975 Rist ........................ 192/91 A
4,650,054 A * 3/1987 Fadler .................... 192/85 CA
6,116,399 A * 9/2000 Drexl et al. .............. 192/91 A
6,634,477 B2 * 10/2003 Beneton et al. ............ 192/48.8

FOREIGN PATENT DOCUMENTS

DE 19953091 8/2001
EP 0185176 3/1989

* cited by examiner

*Primary Examiner*—Richard M Lorence
(74) *Attorney, Agent, or Firm*—Davidson, Davidson & Kappel, LLC

(57) ABSTRACT

An actuating device for transferring a control force of an engaging/disengaging device to a double clutch for coupling a drive shaft to two transmission input shafts is described. The actuating device includes at least two first pistons corresponding to the first clutch, each having a first pressure surface, at least two second pistons corresponding to the second clutch, each having a second pressure surface. The first and second pistons are disposed parallel to an axis of the engaging disengaging device and within a graduated circle concentric to the axis. The actuating device also includes a plurality of elongatable piston guideways, each receiving one of the first and second pistons. The first pressure surfaces are couplable to each other and the second pressure surfaces couplable to each other.

10 Claims, 5 Drawing Sheets

ACTUATING DEVICE FOR TRANSFERRING A CONTROL PISTON FORCE OF AN ENGAGING/DISENGAGING DEVICE TO A DOUBLE CLUTCH

Priority is claimed to German Patent Application No. DE 10 2004 002 344.1, filed on Jan. 16, 2004, the entire disclosure of which is incorporated by reference herein.

The present invention relates to an actuating device for transferring a control force of an engaging/disengaging device to a double clutch for coupling a drive shaft to two transmission input shafts.

BACKGROUND

Actuating devices for the alternating coupling of the particular clutch of a drive shaft to a transmission input shaft are already known from DE 34 46 460 C2, one clutch including a disc spring being disengaged in each case by one control mechanism including an annular piston coaxial to the clutch axis and connected to the relevant disc spring. The two annular pistons are radially offset from one another in the housing.

Another possibility for engaging a drive shaft with a transmission input shaft via alternate coupling of the particular clutch of a double clutch and thereby improving the hysteresis properties of the aforementioned device is described in DE 199 53 091 C1. The hydraulic surface of the two annular pistons lying coaxial to the clutch axis, as described in DE 34 46 460 C2, is in this case replaced by a plurality of subsurfaces, which are derived from the pressure surfaces of rod-shaped single pistons. When actuated, pressure fluid is applied to these single pistons, referred to here as servomotors. Three servomotors having their axes positioned parallel to the clutch axis are assigned to each clutch. All 6 servomotors lie on a graduated circle coaxial to the clutch axis, the 3 control pistons assigned to a clutch being in each case positioned 120° in relation to each other and pressure being constantly applied synchronously to them in the operating state.

However, a disadvantage of these devices is that the application of pressure to a piston or to a piston system (made up of three pistons) is never centrical for each individual piston so that pressure is only applied to each eccentrically. This results in the pistons being tilted in relation to their bearing surface in the cylinder, causing increased friction and finally wear of the pistons and their bearing surfaces.

Furthermore, the length of the pistons is adapted to the corresponding bearing surface and accordingly to the length of the cylinders, which has a negative influence on the weight of the engaging/disengaging device.

Moreover, the three pistons in DE 199 53 091 C1 are not mechanically connected to one another so that in the case of pressure forces of varying strength, each piston is extended a varying distance. This results in the bearing tilting and thus colliding with the housing. Another disadvantage is the direct connection of the three pistons with the particular bearing. This causes a concentrated loading of the bearing and thus reduces the life of the bearing.

SUMMARY OF THE INVENTION

An object of the present invention is to provide an engaging/disengaging device which may be used to implement a centrical and axially guided transfer of high pressure forces to the bearing ring of the particular release bearing or the assigned clutch while retaining a specified required installation space and keeping the piston size small.

The present invention provides an actuating device for transferring a control force of an engaging/disengaging device (1) to a double clutch including at least two pistons (3a, 3b) for each clutch, it being possible to apply pressure to the pistons situated parallel to the clutch axis or to the axis (5) of the engaging/disengaging device (1), the pistons being situated on a graduated circle (2) concentric to the axis (5), wherein the pressure surfaces (19) of the pistons (3a) can each be coupled with one another and the pressure surfaces (20) of the pistons (3b) can each be coupled with one another and the guideway of the pistons (3a, 3b) can be elongated.

To that end, at least two rings situated concentrically about the axis of the engaging/disengaging device between the external cylindrical body component and the internal cylindrical body component are advantageously mechanically linked in each case to at least two pistons situated on a graduated circle about this axis. It is always particularly advantageous to provide three pistons for the activation of a clutch, each of the pistons being offset 120° from one another so that the contact with the ring is already as uniform as possible when force is transferred into the ring. Each of the three pistons offset 120° from one another over the diameter of the graduated circle may be offset as desired on the graduated circle in relation to the other three pistons associated with the second clutch.

The pressure surfaces for a release bearing are coupled by connecting the pressure surfaces of the three pistons responsible for the particular clutch via an adapter in the form of a ring. This ring is connected directly to each individual piston via projections, thus indirectly connecting the pistons.

This arrangement makes it possible for the pressure to be transferred synchronously via provided connections in the base plate of the body of the engaging/disengaging device, the pressure acting centrically on each of the three pistons. Since the pistons and the particular bearing ring do not lie on one line of action, this misalignment is compensated for by the associated ring.

The pressure force is thus not transferred directly to a bearing ring via the particular piston surfaces but instead via the face (pressure surface) of the corresponding ring. Conversely, load differences originating from the clutch are compensated for via the ring and the individual pistons are not tilted in their guideway. As a result, wear is prevented both on the guideway as well as on the piston.

In this way, the disengaging force is transferred uniformly to the bearing ring of the release bearing. This uniform force distribution is also made possible by the concentric placement of the rings about the axis of the engaging/disengaging device and the planes of the pressure surfaces running perpendicular thereto.

Another advantage of the device of the present invention is that the inner ring is guided on the inner cylindrical body component in relation to the outer ring and the outer ring is guided on the outer diameter of the cylindrical body component and is axially displaceable.

Another possibility would also be for the outer ring to be axially displaceable on the inner ring in relation to the outer cylindrical body component.

This causes, for example, the outer release bearing to be axially displaceable in relation to the inner release bearing via the corresponding ring independent of the inner release bearing.

The forces are advantageously transferred via at least two projections placed on the faces of the piston-side ends of the rings in the axial direction. Adjusting the diameter of the two rings causes the offset of the piston with respect to the ring to be of equal magnitude. Thus the 6 projections are all uniformly loaded.

Since, as mentioned above, the force of three pistons is transferred to one clutch, the rings must also be provided with three projections. These projections are in turn offset from one another by 120° and are all the same length. The advantage of this is that when the engaging/disengaging device is not under pressure, the pistons are in contact with the base plate of the body and all 6 projections are in contact with the 6 piston surfaces. In this connection, the two rings assume a starting position in which the piston-side faces are in one plane. This starting position may be used, for example, as a reference point for an adjustment of the rings or the bearing rings for each release bearing in relation to the disc spring of the particular clutch.

For the axial guidance of both rings within the body or of the rings in relation to one another as well as for the design of the guide surface required in each case, it is furthermore advantageous in particular that three recesses of equal size are in turn provided on the circumference on the piston-side faces of both rings, the recesses extending axially over the width of the particular ring, a projection following each recess in alternation.

When the rings are paired, one recess of the inner ring always corresponds, for example, with one projection of the outer ring. Following this principle, the projections of the inner ring are in contact with the recesses of the outer ring. This design makes it possible for the projections to be in solid form, which is particularly advantageous for the transfer of significant forces and reduces the material stress.

Another advantage of the device of the present invention is that the projections of the rings end in cylindrical rams which ensure that the transfer of force is as loss-free as possible. In addition, the axes of symmetry of the pair elements are in alignment with those of the pistons, which is also a prerequisite for an optimum transfer of forces from the piston to the corresponding ring and thus prevents the pistons from tilting in their guideways. This also prevents additional friction and thus extends the life of the engaging/disengaging devices.

According to the present invention, the basis for the transfer of forces with the least possible loss is created by designing the pistons to be hollow and thus placing the pressure surfaces in the interior of the individual piston. In the interior of the pistons, the pressure surface at the end of a cylindrical recess forms the termination of the hollow space. The cylindrical recess simultaneously creates an axial guidance for the rams of the projections of the particular ring which are in contact with the pressure surface.

It is also advantageous, considering the magnitude of the occurring forces, to manufacture all parts in contact with one another, such as the body, the rings, and pistons, from a castable material. This makes it possible to eliminate machining operations, resulting in savings of time and material and ultimately reduces the manufacturing costs significantly.

BRIEF DESCRIPTION OF THE DRAWINGS

The present invention is elucidated in greater detail below based on an exemplary embodiment and with reference to the drawings, in which.

DETAILED DESCRIPTION

Figure 1:
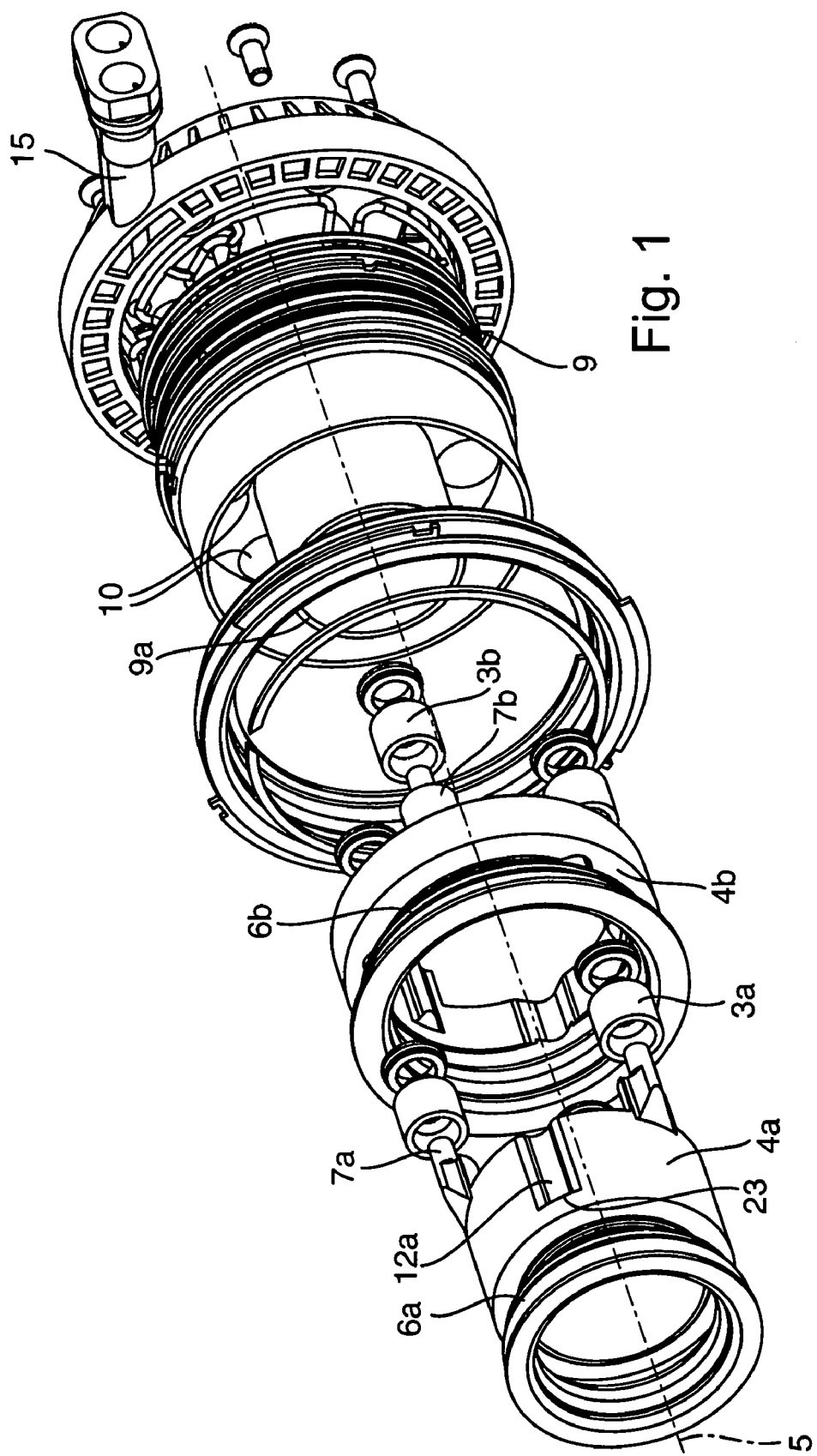
FIG. 1 shows an exploded spatial view of an engaging/disengaging device according to the present invention.

According to FIG. 1, the engaging/disengaging device or the slave cylinder is essentially made up of a double cylindrical body 9 including an inner cylindrical body component 9a and an outer cylindrical body component 9b, which is open on one side, inner cylindrical body component 9a projecting lengthwise beyond outer cylindrical body component 9b. The other side of body 9 is closed by a base plate 9c. Six blind holes 10 are bored into this base plate 9c in the intermediate space between outer cylindrical body component 9b and inner cylindrical body component 9a. In turn, each of these blind holes 10 has a through hole for a fluid connection for pressure fluid supply 15.

Blind holes 10 are situated on a concentric graduated circle 2 and are offset from one another at an angle of 60°. The thickness of base plate 9c of body 9 is essentially based on the length of the guide and the diameter of individual blind hole 10 is based on piston 3a, 3b to be accommodated therein. Advantageously, equal diameters of 6 blind holes 10 are selected and for maximum utilization of space, they are determined by the distance between outer cylindrical body component 9b and inner cylindrical body component 9a. Accordingly, the diameters of pistons 3a, 3b are also of equal size.

Each blind hole 10 represents a cylinder for the particular pistons 3a, 3b and accommodates them.

In this body 9, rings 4a and 4b are accommodated and guided between inner cylindrical body component 9a and outer cylindrical body component 9b. This figure also makes it evident that projections 7a, 7b are placed at the piston-side end of rings 4a, 4b, the feet of the projections projecting partially over the jacket surface of particular ring 4a, 4b. At the same time it is evident that these projections 7a, 7b terminate in cylindrical rams 16a, 16b. Since projections 7a, 7b are used for axial movement within body 9 and accordingly for transferring force from the pistons to the bearing rings and therefore must have a certain stability with respect to high pressures, their cross section must be designed accordingly. They also make it possible to reduce the width of rings 4a, 4b or to lengthen the release surface. In order to take these two functions into account yet not increase the required space, projections 7a, 7b are accommodated in recesses 12a, 12b of the particular other ring 4b, 4a, the form of which is adapted. In order to take the reduced available space into account, projections 7a, 7b are designed to have an appropriately strong foot that is primarily attached to the piston-side face of ring 4a, 4b. This foot terminates in a cylindrical ram 16a, 16b, whose axis of symmetry is on the diameter of ring 4a, 4b. In order to increase the strength of projections 7a, 7b while simultaneously optimally designing the pressure surface, the part of ram 16a, 16b facing the contact surface is lengthened beyond the foot of projection 7a, 7b and extends into the inner circumference of ring 4a, 4b at a length which corresponds to the length of projection 7a, 7b of contacted ring 4a, 4b.

The faces of rams 16a, 16b having a length and a diameter which advantageously correspond to the axial extension and the diameter corresponding with the dimensions of the cylindrical hollow space of a piston 3a, 3b, are in contact with pressure surfaces 19, 20 of pistons 3a, 3b.

Figure 2:
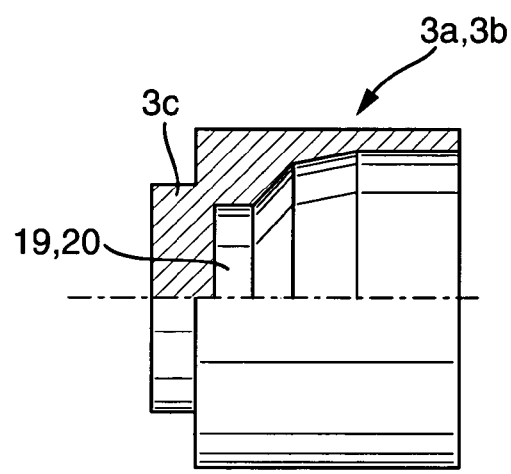
FIG. 2 shows a piston.

The particular design of a piston 3a, 3b is shown in FIG. 2. Each piston 3a, 3b is provided with a nose 3c via which it is in axial contact with base plate 9c and which simultaneously is used to accommodate a seal 11 so that the fluid located in cylinder 10 is not able to penetrate surrounding body 9.

If pressure is applied to engaging/disengaging device 1 by fluid, this fluid is transferred via the holes provided in base plate 9c of body 9 to three pistons 3a or 3b assigned to the corresponding clutch. Pistons 3a or 3b are thus moved axially in their cylinders 10 in the direction of release bearings 6a, 6b.

As already mentioned, rings 4a, 4b are contactable with assigned pistons 3a, 3b and are axially displaceable within one another with play via correspondingly provided piston-shaped projections 7a, 7b which merge into cylinder-shaped rams 16a and 16b. In this way, pistons 3a and 3b, respectively, are indirectly connected to one another. Furthermore, for example, recesses 12a of ring 4b are assigned to projections 7a on ring 4a. Correspondingly, the guide surfaces of recesses 12b of ring 4b are assigned to the projections of ring 4a.

Compared to ring 4b, recesses 12a of ring 4a have the feature that they do not extend across the entire width of ring 4a but instead end abruptly before the end which is in contact with base plate 9c at a stop 23.

When pressure is applied to corresponding three pistons 3a and 3b, respectively, they press simultaneously against projections 7a or 7b, thereby causing ring 4a and ring 4b, respectively, with release bearing 6a or 6b to be engaged or released thus activating the corresponding clutch.

Figure 3:
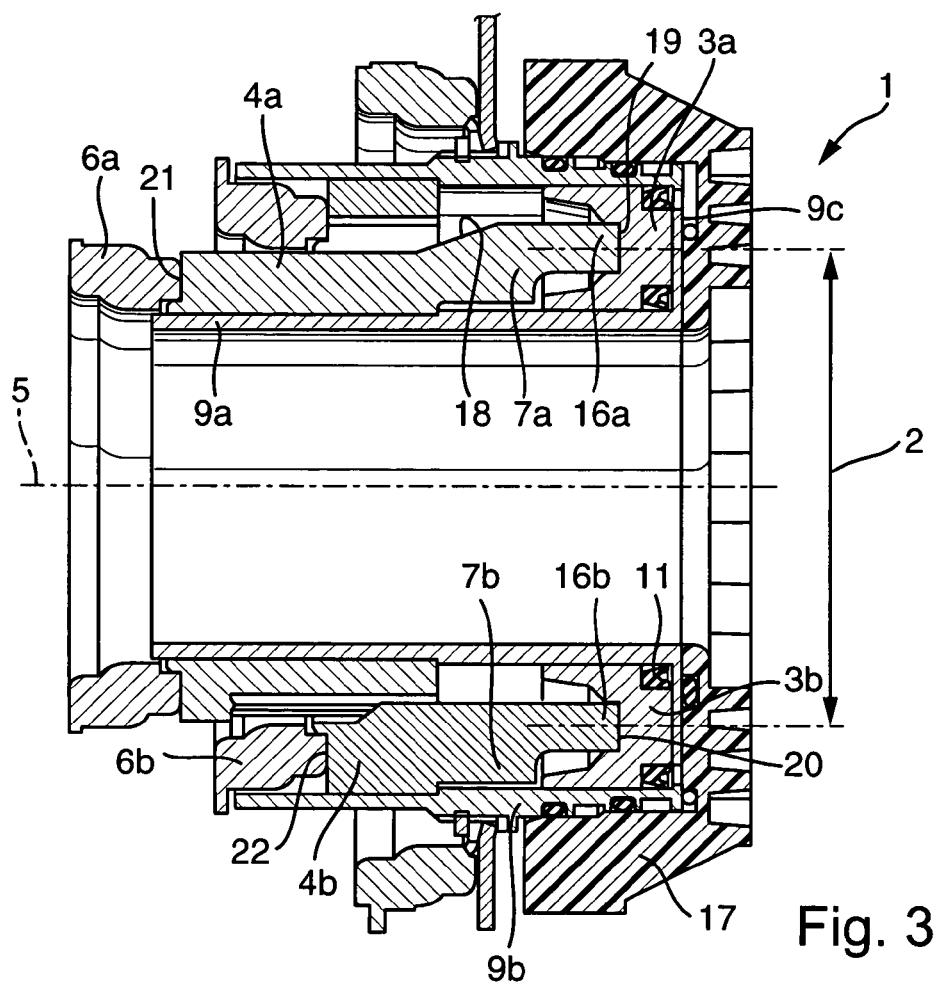
FIG. 3 shows a section of an engaging/disengaging device according to the present invention.

FIG. 3 shows an engaging/disengaging device 1 with a housing 17 in the starting position, i.e., without pressure applied to pistons 3a, 3b. This Figure also shows the two projections 7a and 7b which end in rams 16a and 16b, which in this position are in contact with pressure surfaces 19, 20 of pistons 3a and 3b. Projections 7a have an incline 18 and a face 21. Projections 7b have a face 22.

Figure 4A:
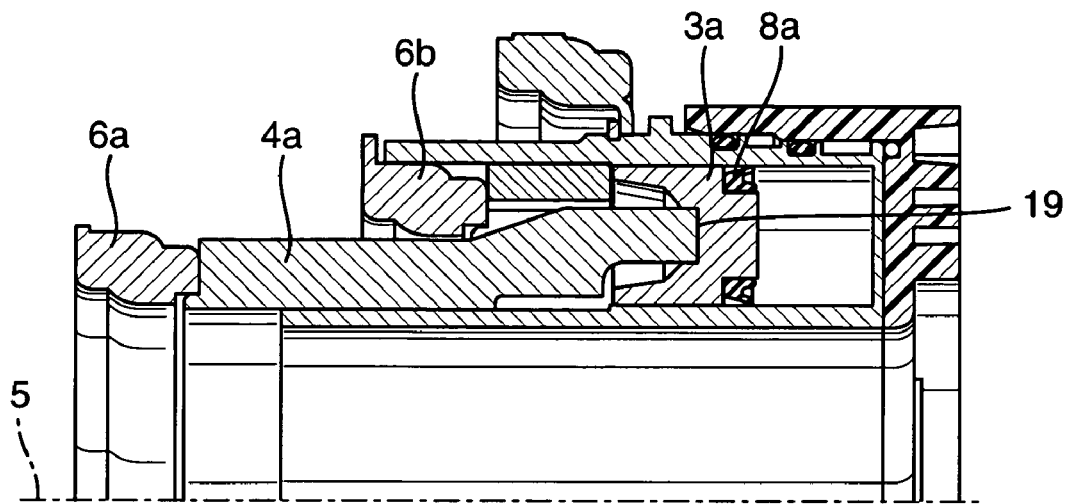
FIG. 4a shows a partial section of the engaging/disengaging device according to FIG. 3, pressure being applied to pistons 3a and ring 4a being disengaged.
Figure 4B:
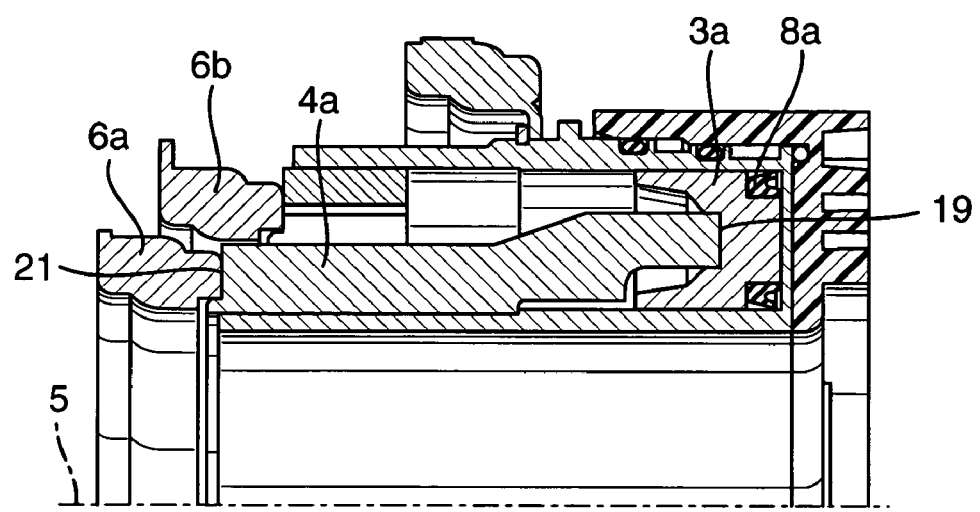
FIG. 4b shows a partial section according to FIG. 3, ring 4a and accordingly also pistons 3a being in their starting position.
Figure 5A:
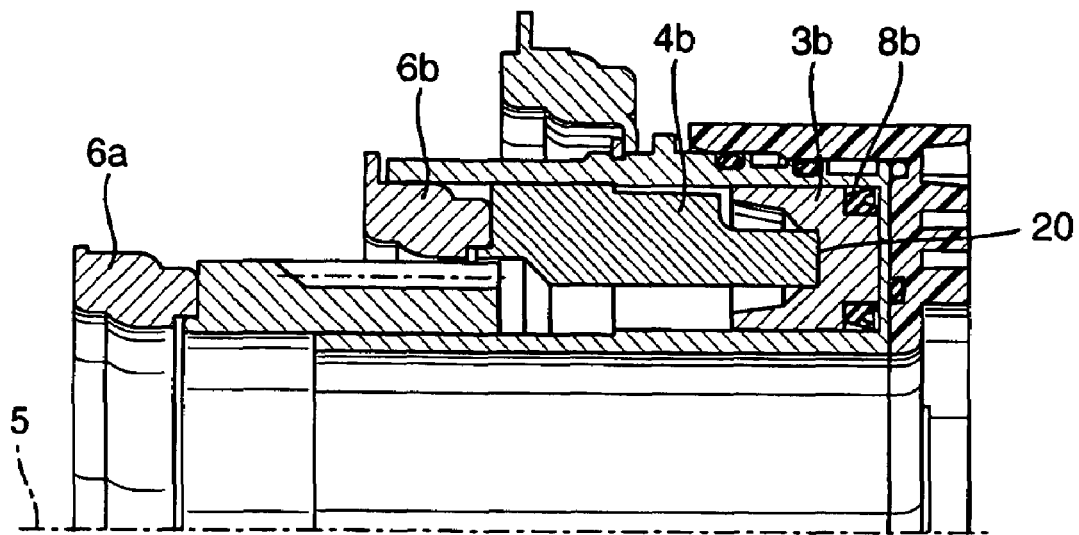
FIG. 5a shows a partial section of the slave cylinder according to FIG. 3, pressure being applied to pistons 3b and ring 4b being disengaged.
Figure 5B:
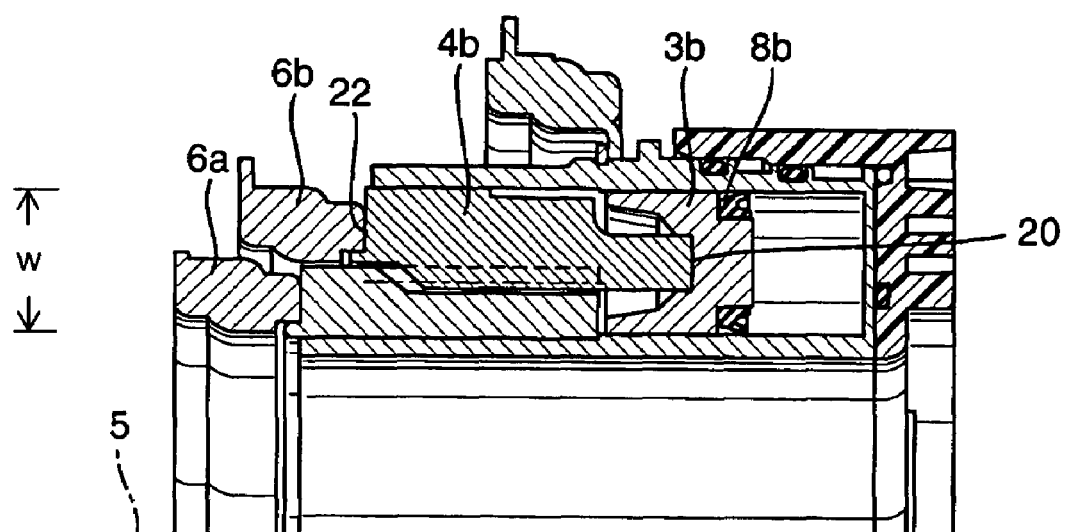
FIG. 5b shows a partial section according to FIG. 3, ring 4b and accordingly also pistons 3b being in their starting position.

FIG. 4a shows one of the three pistons 3a positioned concentrically around graduated circle 2 in the disengaged state, and FIG. 4b shows them correspondingly in the engaged state. Pistons 3a have seals 8a. FIGS. 5a and 5b illustrate the mode of operation of engaging/disengaging device 1 for pistons 3b accordingly. Pistons 3b have seals 8b. FIG. 5b also shows the total width w of rings 4a and 4b.

Figure 6:
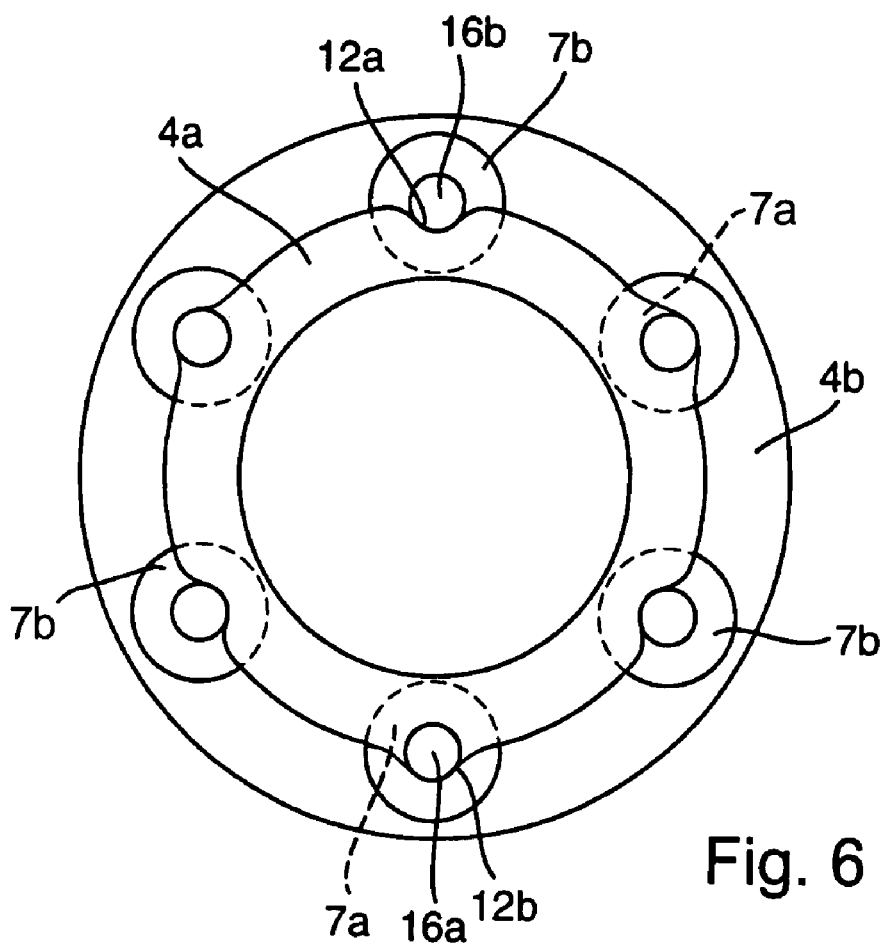
FIG. 6 shows pressure surfaces of rings 4a and 4b (rings in the installed state).

FIG. 6 shows the placement of the pressure surfaces of the two rings 4a and 4b in the installed state. From this it may be seen that irrespective of the selection of pressurized piston 3a or 3b, the pressure force is constantly transferred axially via the imaginary graduated circle diameter 2 of projections 7a and 7b, which is aligned with the graduated circle diameter of pistons 3a and 3b, respectively. This ensures a transfer of pressure force from pistons 3a and 3b to rings 4a and 4b, respectively, with the least amount of loss.

What is claimed is:

1. An engaging/disengaging device having an axis and engaging or disengaging a double clutch having a first clutch and a second clutch, comprising:
   at least two first pistons corresponding to the first clutch, each having a first pressure surface;
   at least two second pistons corresponding to the second clutch, each having a second pressure surface, the first and second pistons disposed parallel to the axis-along a graduated circle defined by a radius from the axis, the graduated circle disposed concentric to the axis;
   a plurality of piston guideways, each receiving one of the first and second pistons, wherein the first pressure surfaces are couplable to each other and the second pressure surfaces are couplable to each other, so that the first and second pistons can move in the piston guideways, the first pressure surfaces being mechanically coupled in the engaging/disengaging device; and
   an outer cylindrical body component and an inner cylindrical body component, and a first ring and a second ring disposed concentrically about the axis between the outer cylindrical body component and the inner cylindrical body component, the first ring being mechanically linked with the at least two first pistons and the second ring mechanically linked to the at least two second pistons.

2. The engaging/disengaging device as recited in claim 1, wherein the first ring is axially displaceable on the inner cylindrical body component relative to the second ring and the second ring is axially displaceable on the outer cylindrical body component relative to the first ring.

3. The engaging/disengaging device as recited in claim 1, wherein the first ring includes a first bearing face in contact with a first release bearing, and the second ring includes a second bearing face in contact with a second release bearing, and first and second faces defining planes perpendicular to the axis.

4. The engaging/disengaging device as recited in claim 1, wherein the first ring includes at least two first projections projecting axially from a first piston-side face of the first ring and wherein the second ring includes at least two second projections projecting axially from a second piston-side face of the second ring, wherein the first and second projections are of equal length and each projection includes a cylindrical ram forming a piston-side end of the projection.

5. The engaging/disengaging device as recited in claim 1, wherein each of the first and second rings includes at least two recesses disposed on its circumference on the piston-side faces of the rings, each recess extending axially over a width of the respective ring and configured to receive respective one of the projections.

6. The engaging/disengaging device as recited in claim 5, wherein each of the at least two projections of the second ring coincides with, and is axially movable within, a respective recess of the first ring.

7. The engaging/disengaging device as recited in claim 4, wherein an axis of symmetry of each of the cylindrical rams is aligned with an axis of symmetry of a respective recesses and an axis of symmetry of a respective piston.

8. The engaging/disengaging device as recited in claim 1, wherein a total width of the first and second rings corresponds to a diameter of the corresponding first and second pistons.

9. The engaging/disengaging device as recited in claim 1, wherein the inner cylindrical body component, the outer cylindrical body component, the first and second rings, and the first and second pistons include a castable material.

10. An engaging/disengaging device having an axis and engaging or disengaging a double clutch having a first clutch and a second clutch, comprising:
   at least two first pistons corresponding to the first clutch, each having a first pressure surface;
   at least two second pistons corresponding to the second clutch, each having a second pressure surface, the first and second pistons disposed parallel to the axis along a graduated circle defined by a radius from the axis, the graduated circle disposed concentric to the axis; and
   a plurality of piston guideways, each receiving one of the first and second pistons,
   wherein the first pressure surfaces are couplable to each other and the second pressure surfaces are couplable to each other, so that the first and second pistons can move in the piston guideways;
   further comprising an outer cylindrical body component and an inner cylindrical body component, and a first ring and a second ring disposed concentrically about the axis between the outer cylindrical body component and the inner cylindrical body component, the first ring being mechanically linked with the at least two first pistons and the second ring mechanically linked to the at least two second pistons.

* * * * *